United States Patent
Schaffner

(10) Patent No.: US 7,040,824 B2
(45) Date of Patent: May 9, 2006

(54) GEL-CUSHIONED ACCESSORY FOR A KEYBOARD

(76) Inventor: Clare Schaffner, 101 Decker La., Pittsburgh, PA (US) 15237

( * ) Notice: Subject to any disclaimer, the term of this patent is extended or adjusted under 35 U.S.C. 154(b) by 0 days.

(21) Appl. No.: 10/942,352

(22) Filed: Sep. 16, 2004

(65) Prior Publication Data

US 2006/0056898 A1 Mar. 16, 2006

(51) Int. Cl.
*B41J 5/12* (2006.01)

(52) U.S. Cl. .................. 400/491; 400/490; 400/493

(58) Field of Classification Search .............. 400/490, 400/491, 493, 472
See application file for complete search history.

(56) References Cited

U.S. PATENT DOCUMENTS

| | | | |
|---|---|---|---|
| 5,017,036 A | | 5/1991 | Vidovic |
| 5,183,346 A | * | 2/1993 | Tesar .................. 400/490 |
| 5,290,115 A | * | 3/1994 | Little .................. 400/491 |
| 5,612,691 A | | 3/1997 | Murmann et al. |
| 5,813,777 A | * | 9/1998 | Bonnstauffer .......... 400/491 |
| 5,899,616 A | | 5/1999 | Caplan |
| 6,086,107 A | * | 7/2000 | Whistler et al. ........ 283/81 |
| 6,183,149 B1 | | 2/2001 | Caplan |
| 6,331,083 B1 | * | 12/2001 | Harris ................. 400/493 |
| 6,404,621 B1 | | 6/2002 | Zamora et al. |

FOREIGN PATENT DOCUMENTS

| | | | |
|---|---|---|---|
| DE | 10300619 A1 | * | 7/2004 |
| GB | 2386098 A | * | 9/2003 |
| JP | 06202777 A | * | 7/1994 |

\* cited by examiner

*Primary Examiner*—Andrew H. Hirshfeld
*Assistant Examiner*—Dave A. Ghatt
(74) *Attorney, Agent, or Firm*—Carothers & Carothers

(57) ABSTRACT

A cushioning means for placement on a computer keyboard is provided for reducing the discomfort of a typist using a keyboard and to personalize the keyboard for a typist. A pad may be attached or applied to one or more keytops of a conventional keyboard, each pad being of a self-adhesive reusable translucent gel material. The pads may be attached to the individual keys without a separate adhesive layer. The pads are translucent allowing the key identifier to remain unobstructed to a user. The pads may be used not only to cushion the keyboard, but to allow a user to personalize or decorate her keyboard. The pads may be of an assortment of colors and predetermined sizes in order to fit over the different keyboard keys. The pads may also be used to cushion or decorate other office devices including a computer mouse and a telephone keypad.

27 Claims, 3 Drawing Sheets

GEL-CUSHIONED ACCESSORY FOR A KEYBOARD

TECHNICAL FIELD

This invention relates to a cushioning or decorative apparatus, and in particular to such cushioning or decorative apparatus as is used in connection with the keyboard of a computer or other frequently used office device.

BACKGROUND

With the advent of the information age, more and more people are obtaining and using computers and electronic typewriters, whether at work or at home or both. The main input device for most computers and electronic typewriters in use today is the keyboard, and so the use of keyboards has also increased.

With the increase in the use of keyboards has come an increase in injuries, pain, discomfort, and fatigue caused by repetitive use of the fingers. More and more individuals are using computers either at work or at home and such use has increased across all demographic categories. Computer use is now more widespread among the elderly population for keeping in touch with grandchildren, the working population for both office and personal use, and the younger generation as a means of social and entertainment activities.

Typists using keyboards have experienced a number of conditions, including pain, nerve damage, bone damage and arthritis in the joints. Fingertips may also feel like they are burning or throbbing when they touch the keyboard. Also, use of the keyboard leads to fatigue and general discomfort, especially after extended use. Hence, there appears to be need in the market for some device or apparatus for reducing the pain, fatigue or discomfort caused in some individuals by keyboard use. Additionally, due to the extended time many people spend in the office or at home at the computer, a decorative feature of a keyboard may be well received. Therefore, there is a need in the market for a device that acts as a decorative accessory as a means to personalize keyboards.

There have been several devices proposed in the art to alleviate some of the symptoms caused by extended use of the keyboard. Several ergonomic designs have been proposed including the keyboards described in U.S. Pat. Nos. 5,017,036; 5,612,691; and 6,404,621. These designs depart from the traditional layout of a relatively flat keyboard, providing a user new choices in keyboard designs, not a means to adapt an existing keyboard. For example in U.S. Pat. No. 5,612,691, the keyboard is designed to have least two sections which are pivotable and tiltable with respect to each other. Additionally, others have attempted to put a cushioning device which would surround and redesign the entire keyboard surface. These include the keyboards and cushioning attachment described in U.S. Pat. Nos. 6,183,149 and 5,899,616. In these patents, an attachment which is inflatable is placed over the keyboard keys such that different keys are of different heights so to reduce tension of a user's arms and fingers.

Finally, in U.S. Pat. No. 5,290,115, individual cushioning pads are described for attachment to a keyboard. The cushioning pads described in this patent, however, have several drawbacks in that the pads become a permanent fixture to the computer keyboard, and removal requires the removal of residue adhesive. Additionally, the cushioning devices described in the art all have covered the keys from the user, so that the letter, symbol or number identifier of the individual key is no longer displayed to the user. The use of the prior art cushioning means requires the use of an additional attachment of a separate identifier to each of the cushioned keys in order to render the keyboard functional.

There remains a need in the art to supply a cushioning means to a keyboard which is convenient to the user, inexpensive, easily removed, and desirable to use.

SUMMARY

One embodiment of the invention is a plurality of cushioning means which are designed to be placed directly on one or more keyboard keys, wherein the cushioning means comprise a plurality of separate pads, wherein each of the pad is shaped and sized to fit onto a predetermined key, wherein each of the pads is of a self-adhesive reusable translucent gel material, wherein each of the pads has a top surface and a bottom surface, wherein each of the bottom surfaces of the pads directly contact each of the keys, wherein each of the pads are substantially flat, are of substantially homogeneous material and are of a substantially uniform thickness after installation upon the keys, and wherein the top surface of each of the pads is smooth to the touch, wherein a user using the keyboard would contact the top surface each of the pads.

The cushioning means may be used to adapt a computer comprising a keyboard, wherein the keyboard has a plurality of keys, so as to cushion the computer for a user. The cushioning means may be of a variety of colors. The separate pads may be about ⅛ inch thick. The cushioning means may comprise a pad shaped and sized to fit over a top surface of a computer mouse apparatus, wherein the pad is of a self-adhesive reusable translucent gel material, wherein the pad has a top surface and a bottom surface, and wherein the bottom surface of the pad is capable of directly contacting the mouse apparatus. The top surface of each of the pads may be smooth to the touch by means of a coating, a thin transparent plastic film, and combinations thereof.

The cushioning means may be used as a computer accessory for adapting a computer having a keyboard, wherein the keyboard has a plurality of keys, so as to decorate the computer. The cushioning means may be packaged into an assortment which comprises at least one of each of the pads which fit onto each of the predetermined sized-keys and may further comprise a pad to fit over the mouse apparatus. The assortment may contain a plurality of the pads which are sized to be placed over the letter and number keys.

Another embodiment of the present invention is a method of personalizing a computer, comprising applying to a keyboard having a plurality of keys, a plurality of separate pads, wherein each of the pad is shaped and sized to fit onto a predetermined key, wherein each of the pads is of a self-adhesive reusable translucent gel material, wherein each of the pads has a top surface and a bottom surface, wherein each of the bottom surfaces of the pads directly contact each of the keys, wherein each of the pads are substantially flat, are of substantially homogeneous material and are of a substantially uniform thickness after installation upon the keys, and wherein the top surface of each of the pads is smooth to the touch, wherein a user using the keyboard would contact the top surface each of the pads.

Another embodiment of the invention is a means of personalizing and/or cushioning other office devices having a keypad with cushioning means. The cushioning means comprise a plurality of separate pads, wherein each of the pad is shaped and sized to fit onto a predetermined key, wherein each of the pads is of a self-adhesive reusable translucent gel material. Suitable office devices include a telephone.

BRIEF DESCRIPTION OF THE DRAWINGS

Various aspects and applications of the present invention will become apparent to the skilled artisan upon consideration of the brief description of the figures and the detailed description of the invention, which follows.

DETAILED DESCRIPTION

Figure 1:
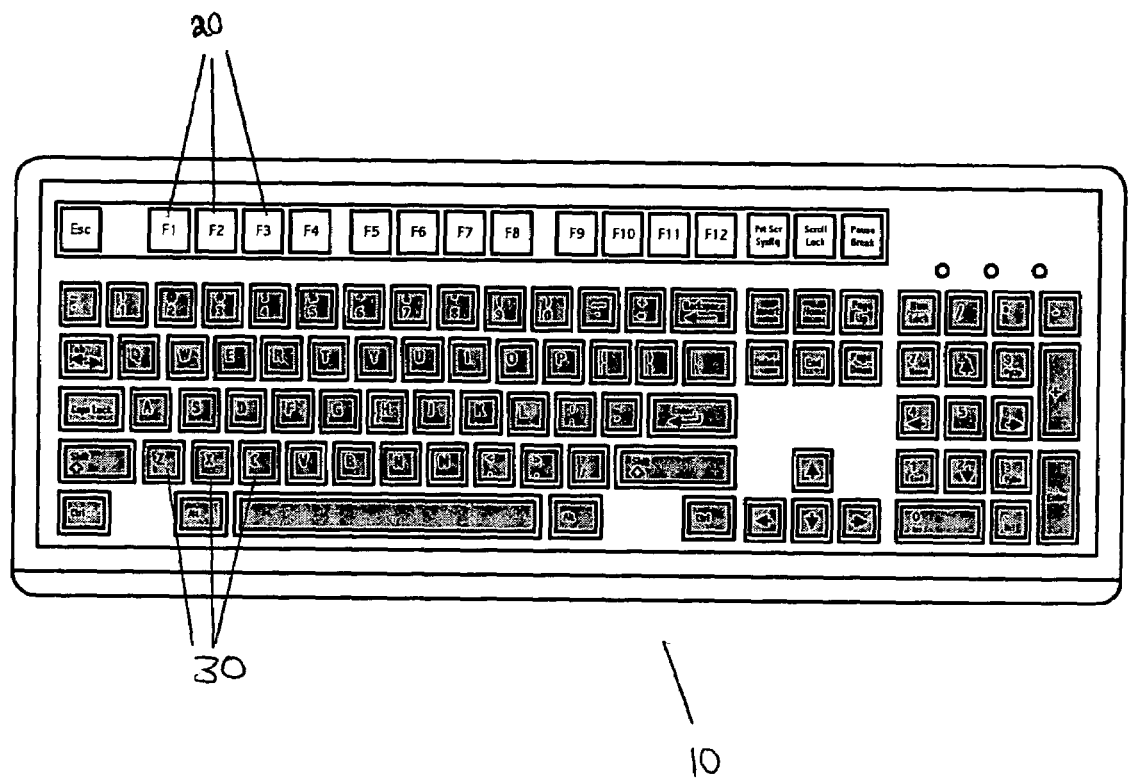
FIG. 1 is a top view of a keyboard having cushioning means applied thereto according to one embodiment of the invention.

Before the present compositions and methods are described, it is to be understood that this invention is not limited to the particular materials, dimensions, designs, or uses, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural reference unless the context clearly dictates otherwise. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred compositions, methods, devices, and materials are now described. All publications mentioned herein are incorporated by reference in their entirety. Nothing herein is to be construed as an admission that the invention is not entitled to antedate such disclosure by virtue of prior invention.

Embodiments described herein are to be used in connection with any keyboard, typewriter, or office device having a number of keys or keytops, buttons, or pads. All the devices have one or more keys, which each have an individual identifier, such as a number or letter value associated with the key. For convenience, this application will refer to a keyboard associated with a personal computer or laptop computer. Embodiments described herein may be used with any keyboard, whether traditionally designed or ergonomically designed.

One embodiment of the invention is a plurality of cushioning means which are designed to be placed directly on one or more keyboard keys, wherein the cushioning means comprise a plurality of separate pads. Each pad is shaped and sized to fit onto a predetermined key, wherein the size corresponds to the keytop surface of the keys on a standard keyboard. Cushioning means may be designed for the letter and number keys, which are generally of the same size and shape, for the elongated keys, such as the "backspace" and "enter" keys, and for the individually shaped keys, such as the space bar. Each pad is of substantially the same material, wherein each of the pads is of a self-adhesive reusable transparent or translucent gel material. The gel material may be clear, or may be of any number of colors and of varying degrees of transparency. The gel should be as transparent or translucent, such that a user of the keyboard would be able to see through the pad to read the key's identifier. The gel is self-adhesive, such that no additional adhesive is necessary to attach the pad to the individual key. The self-adhesive gel may be removed from a key without leaving a residual or sticky material behind. The pads are reusable and maintain their adhesive nature. Each of the pads has a top surface and a bottom surface, wherein each of the bottom surfaces of the pads directly contact each of the keys. Each of the pads are substantially flat, are of substantially homogeneous material and are of a substantially uniform thickness before and after installation upon the keys. Preferably, the pads are about ⅛ inch thick. However, other pad thickness, or varying thickness may be possible.

Gel of this composition is commercially available from RTOM of Carlstadt, N.J., USA, under the trademark MOONGEL. An exemplary embodiment of the gel is described beginning at line 13, in column 2, of U.S. Pat. No. 5,637,819.

Each of the top surfaces of the pads may be smooth to the touch, so that a user does not contact the self-adhesive bottom surface of the pad. The top surface of the pads may be a non-adhesive gel-like material. The top surface of each of the pads be may coated with a smooth coating, or may be coated with a thin transparent plastic film.

Cushioning means may also comprise a thin transparent plastic film fitting over the top surface of each of the pads, wherein the film is smooth to the touch, wherein a user of the keyboard would contact the film fitting over each of the pads. The plastic film would be transparent enough such that it may be placed over each of the pads without substantially interfering with the visibility of the key identifiers. Suitable plastic films include polyvinylidene chloride and other transparent plastics typically used in packaging or related applications. The thin plastic film may adhere to the self-adhesive top surface of the pads. Optionally, the side surfaces of the pads may be covered in the thin plastic film. The thickness of the thin plastic film is preferably less than about 1/32 inch.

The cushioning means may be used to adapt a computer comprising a keyboard, wherein the keyboard has a plurality of keys, so as to cushion the computer for a user. The cushioning means may be of a variety of colors. The separate pads may be about ⅛ inch thick. The cushioning means may comprise a pad shaped and sized to fit over a top surface of a computer mouse apparatus, wherein the pad is of a self-adhesive reusable translucent gel material, wherein the pad has a top surface and a bottom surface, wherein the bottom surface of the pad is capable of directly contacting the mouse apparatus, and wherein the top surface of the pad is smooth to the touch.

The cushioning means may be used as a computer accessory for adapting a computer having a keyboard, wherein the keyboard has a plurality of keys, so as to decorate the computer. The cushioning means may be packaged into an assortment which comprises at least one of each of the pads which fit onto each of the predetermined sized-keys and may further comprise a pad to fit over the mouse apparatus. The assortment may contain a plurality of the pads which are sized to be placed over the letter and number keys. The assortment may be packaged such that the plurality of pads are positioned on release paper for convenient removal by a user.

Another embodiment of the present invention is a method of cushioning and/or personalizing a computer, comprising applying to a keyboard having a plurality of keys, a plurality of separate pads, wherein each of the pads is shaped and sized to fit onto a predetermined key, wherein each of the pads is of a self-adhesive reusable translucent gel material, wherein each of the pads has a top surface and a bottom surface, wherein each of the bottom surfaces of the pads directly contact each of the keys, and wherein each of the pads are substantially flat, are of substantially homogeneous material and are of a substantially uniform thickness after installation upon the keys.

Another embodiment of the invention is personalizing and/or cushioning other office devices having a keypad with cushioning means. The cushioning means comprise a plurality of separate pads, wherein each of the pad is shaped and sized to fit onto a predetermined key, wherein each of the pads is of a self-adhesive reusable translucent gel material, wherein each of the pads has a top surface and a bottom surface, wherein each of the bottom surfaces of the pads directly contact each of the keys, and wherein each of the pads are substantially flat, are of substantially homogeneous material and are of a substantially uniform thickness after installation upon the keys. Suitable office devices include a telephone.

DETAILED DESCRIPTION OF THE DRAWINGS

Figure 2:
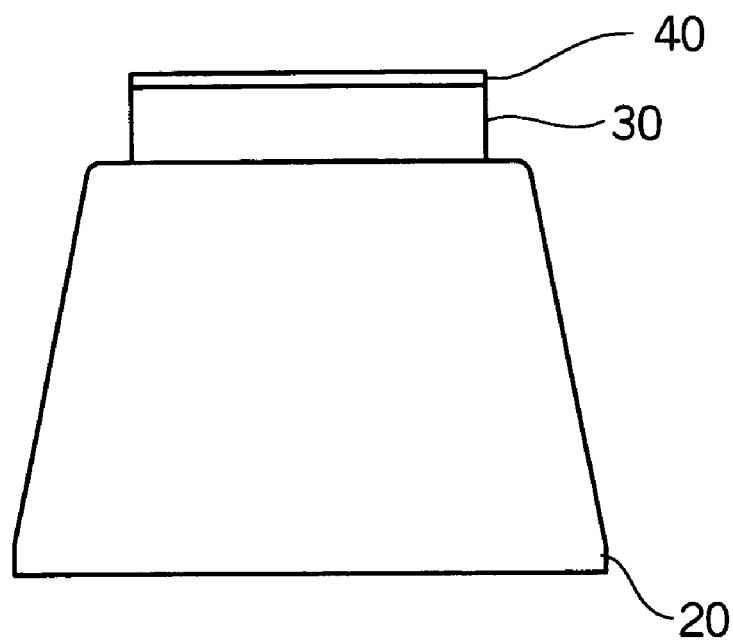
FIG. 2 is a side view of a single key of a keyboard having cushioning means applied thereto according to one embodiment of the invention.
Figure 3:
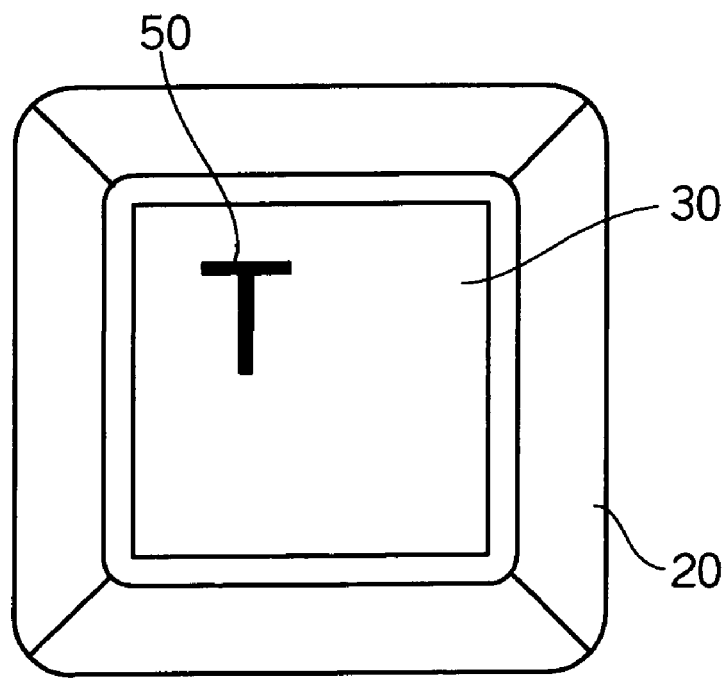
FIG. 3 is a top view of a single key of a keyboard having cushioning means applied thereto to one embodiment of the invention.

FIG. 1 is a top view of a keyboard having cushioning means applied thereto according to the invention. The keyboard 10 has a number of individual keys 20, which may be cushioned by a number of individual pads 30 placed over the keys. FIG. 2 is a side view of a single key of a keyboard having cushioning means applied thereto according to the invention. The self-adhesive translucent pad 30 may be coated with a thin film of plastic 40 which covers at least its top surface. The bottom surface of the pad 30 directly contacts the key 20. FIG. 3 is a top view of a single key 20 of a keyboard having cushioning means 30 applied thereto according to the invention. The pads 30 are translucent, so that a user of the keyboard 10 may still see the individual key identifiers 50 through the pad.

Figure 4:
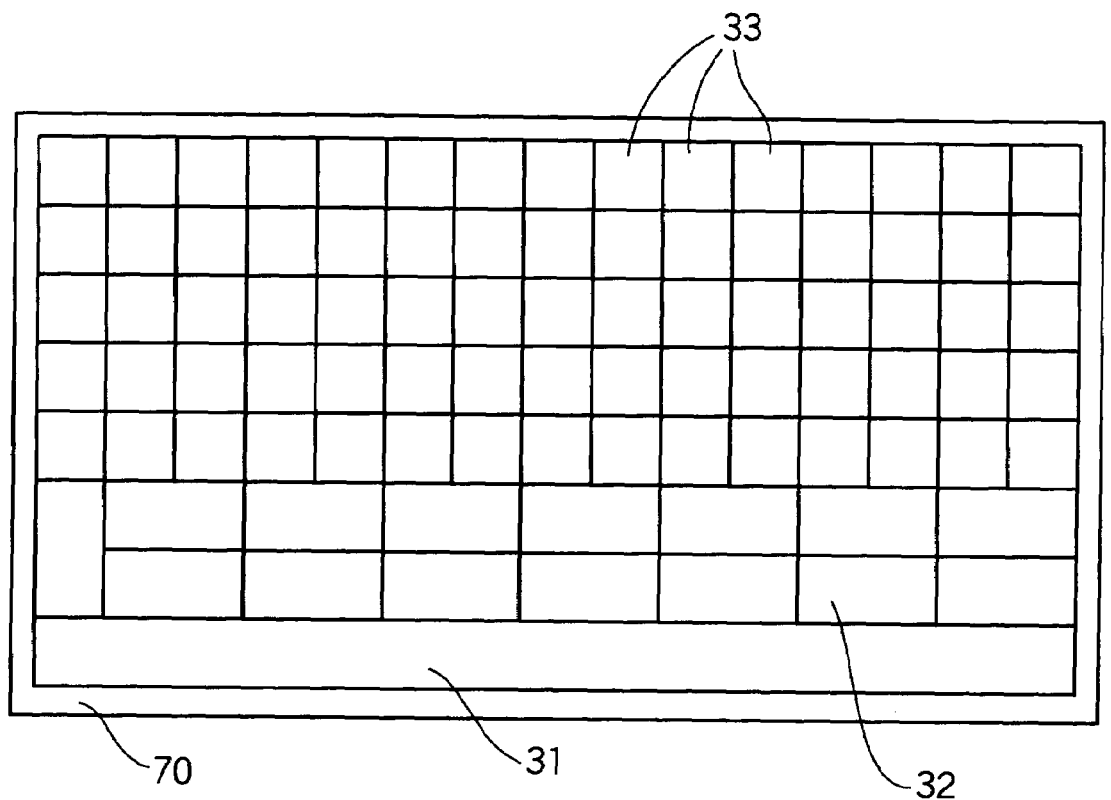
FIG. 4 is a front view of a number of pads according to one embodiment of the invention, arranged efficiently on a single sheet of release paper.

FIG. 4 is a front view of a number of pads 30 according to the invention, arranged efficiently on a single sheet of release paper 70. The assortment may contain at least one pad for each key of a standard keyboard. For example, each assortment may comprise one of the space bar pad 31, one enter key pad 32, and a plurality of letter and number pads 33. The assortment may contain a number of pads of different colors and sizes. When not on the keyboard, the pads may be stored or returned to the release paper 70.

While preferred embodiments have been described in detail, variations may be made to these embodiments without departing from the spirit or scope of the attached claims.

What is claimed is:

1. Cushioning means for adapting a computer comprising a keyboard, wherein the keyboard has a plurality of keys, so as to cushion the computer for a user, the cushioning means comprising:
   a plurality of separate pads, wherein each of the pads is shaped and sized to fit onto a predetermined key, wherein each of the pads is of a self-adhesive reusable translucent gel material, wherein each of the pads has a top surface and a bottom surface, wherein each of the bottom surfaces of the pads directly contact each of the keys, wherein each of the pads are substantially flat, are of substantially homogeneous material and are of a substantially uniform thickness after installation upon the keys, and wherein the top surface of each of the pads is smooth to the touch, wherein a user using the keyboard would contact the top surface each of the pads.

2. The cushioning means of claim 1, wherein the pads may be of a variety of colors.

3. The cushioning means of claim 1, wherein the pads are about ⅛ inch thick.

4. The cushioning means of claim 1, wherein the top surface of each of the pads is smooth to the touch by means of a coating, a thin transparent plastic film, and combinations thereof.

5. The cushioning means of claim 1, further comprising a pad shaped and sized to fit over a top surface of a computer mouse apparatus, wherein the pad is of a self-adhesive reusable translucent gel material, wherein the pad has a top surface and a bottom surface, wherein the bottom surface of the pad is capable of directly contacting the mouse apparatus, and wherein the top surface of the pad is smooth to the touch.

6. A computer accessory for adapting a computer having a keyboard, wherein the keyboard has a plurality of keys, so as to decorate the computer, said accessory comprising:
   a plurality of separate pads, wherein each of the pads is shaped and sized to fit onto a predetermined key of the keyboard, wherein the plurality of pads comprises at least one of each of the pads that fit onto each of the predetermined sized-keys, wherein each of the pads is of a self-adhesive reusable translucent gel material, wherein each of the pads has a top surface and a bottom surface, wherein each of the bottom surfaces of the pads directly contact each of the keys, wherein each of the pads are substantially flat, are of substantially homogeneous material and are of a substantially uniform thickness after installation upon the keys, and wherein the top surface of each of the pads is smooth to the touch, wherein a user using the keyboard would contact the top surface each of the pads.

7. The computer accessory of claim 6, wherein the pads may be of a variety of colors.

8. The computer accessory of claim 6, wherein the pads are about ⅛ inch thick.

9. The computer accessory of claim 6, wherein the top surface of each of the pads is smooth to the touch by means of a coating, a thin transparent plastic film, and combinations thereof.

10. The computer accessory of claim 6, further comprising a pad shaped and sized to fit over a top surface of a computer mouse apparatus, wherein the pad is of a self-adhesive reusable translucent gel material, wherein the pad has a top surface and a bottom surface, wherein the bottom surface of the pad is capable of directly contacting the mouse apparatus, and wherein the top surface of the pad is smooth to the touch.

11. An assortment of pads for adapting a keyboard, having a plurality of keys, said assortment comprising:
   a plurality of separate pads, wherein each of the pads is shaped and sized to fit onto a predetermined key, wherein the assortment comprises at least one of each of the pads which fit onto each of the predetermined sized-keys, wherein each of the pads is of a self-adhesive reusable translucent gel material, wherein each of the pads has a top surface and a bottom surface, wherein each of the bottom surfaces of the pads directly contact each of the keys, wherein each of the pads are substantially flat, are of substantially homogeneous material and are of a substantially uniform thickness after installation upon the keys, and wherein the top surface of each of the pads is smooth to the touch, wherein a user using the keyboard would contact the top surface each of the pads; and a release sheet upon which the plurality of separate pads are arranged for detachment, wherein the bottom surface of the pads contact the release sheet.

12. The assortment of claim 11, wherein the pads may be of a variety of colors.

13. The assortment of claim 11, wherein the pads are about ⅛ inch thick.

14. The assortment of claim 11, wherein the top surface of each of the pads is smooth to the touch by means of a coating, a thin transparent plastic film, and combinations thereof.

15. The assortment of claim 11, further comprising a pad shaped and sized to fit over a top surface of a computer mouse apparatus, wherein the pad is of a self-adhesive reusable translucent gel material, wherein the pad has a top surface and a bottom surface, wherein the bottom surface of the pad is capable of directly contacting the mouse apparatus, wherein the bottom surface of the pad is capable of directly contacting the mouse apparatus, and wherein the top surface of the pad is smooth to the touch.

16. A computer apparatus, comprising:
a keyboard having a plurality of keys, each corresponding to at least one character or number, and each having a keytop surface;
means for said keys communicating with an output device;
an output device;
a plurality of pads supplied to a plurality of respective keys, wherein each pad is shaped and sized to fit onto a predetermined keytop surface, wherein each of the pads is of a self-adhesive reusable translucent gel material, wherein each of the pads has a top surface and a bottom surface, wherein each of the bottom surfaces of the pads directly contact each of the keys, wherein each of the pads are substantially flat, are of substantially homogeneous material and are of a substantially uniform thickness after installation upon the keys, and wherein the top surface of each of the pads is smooth to the touch, wherein a user using the keyboard would contact the top surface each of the pads.

17. The computer apparatus of claim 16, wherein the pads may be of a variety of colors.

18. The computer apparatus of claim 16, wherein the pads are about ⅛ inch thick.

19. The computer apparatus of claim 16, wherein the top surface of each of the pads is smooth to the touch by means of a coating, a thin transparent plastic film, and combinations thereof.

20. The computer apparatus of claim 16, further comprising a mouse apparatus and a pad shaped and sized to fit over a top surface of a computer mouse apparatus, wherein the pad is of a self-adhesive reusable translucent gel material, wherein the pad has a top surface and a bottom surface, wherein the bottom surface of the pad is capable of directly contacting the mouse apparatus, wherein the bottom surface of the pad is capable of directly contacting the mouse apparatus, and wherein the top surface of the pad is smooth to the touch.

21. A method of personalizing a computer, comprising
applying to a keyboard having a plurality of keys, a plurality of separate pads, wherein each of the pads is shaped and sized to fit onto a predetermined key, wherein each of the pads is of a self-adhesive reusable translucent gel material, wherein each of the pads has a top surface and a bottom surface, wherein each of the bottom surfaces of the pads directly contact each of the keys, wherein each of the pads are substantially flat, are of substantially homogeneous material and are of a substantially uniform thickness after installation upon the keys, and wherein the top surface of each of the pads is smooth to the touch, wherein a user using the keyboard would contact the top surface each of the pads.

22. The method of claim 21, wherein the pads may be of a variety of colors.

23. The method of claim 21, wherein the pads are about ¼ inch thick.

24. The method of claim 21, wherein the top surface of each of the pads is smooth to the touch by means of a coating, a thin transparent plastic film, and combinations thereof.

25. The method of claim 21, further comprising applying to a mouse apparatus a pad shaped and sized to fit over a top surface of a computer mouse apparatus, wherein the pad is of a self-adhesive reusable translucent gel material, wherein the pad has a top surface and a bottom surface, wherein the bottom surface of the pad is capable of directly contacting the mouse apparatus, wherein the bottom surface of the pad is capable of directly contacting the mouse apparatus, and wherein the top surface of the pad is smooth to the touch.

26. Cushioning means for adapting an office device having a keypad, wherein the keypad, having a plurality of keys, so as to cushion and personalize the keys, the cushioning means comprising:
a plurality of separate pads, wherein each of the pad is shaped and sized to fit onto a predetermined key, wherein each of the pads is of a self-adhesive reusable translucent gel material, wherein each of the pads has a top surface and a bottom surface, wherein each of the bottom surfaces of the pads directly contact each of the keys, wherein each of the pads are substantially flat, are of substantially homogeneous material and are of a substantially uniform thickness after installation upon the keys, and wherein the top surface of each of the pads is smooth to the touch, wherein a user using the keyboard would contact the top surface each of the pads.

27. The cushioning means of claim 21, wherein the office device is a telephone.

* * * * *